(12) United States Patent
Yiannios et al.

(10) Patent No.: US 12,256,756 B2
(45) Date of Patent: *Mar. 25, 2025

(54) GUMMIES CONTAINING FORMULATIONS WITH ENHANCED DELIVERY MATRIX, AND METHODS OF MAKING SAME

(71) Applicant: VITASOME LABS, LLC, Gilbert, AZ (US)

(72) Inventors: James John Yiannios; Judith S. Reyes, Tempe, AZ (US); Ryan C. Jones, Scottsdale, AZ (US)

(73) Assignee: Vitasome Labs LLC., Gilbert, AZ (US)

( * ) Notice: Subject to any disclaimer, the term of this patent is extended or adjusted under 35 U.S.C. 154(b) by 921 days.

This patent is subject to a terminal disclaimer.

(21) Appl. No.: 17/358,857

(22) Filed: Jun. 25, 2021

(65) Prior Publication Data

US 2021/0315229 A1 Oct. 14, 2021

Related U.S. Application Data (63) Continuation-in-part of application No. 17/007,706, filed on Aug. 31, 2020, now Pat. No. 11,044,923, which is a continuation-in-part of application No. 16/522,021, filed on Jul. 25, 2019, now abandoned, which is a continuation of application No. PCT/US2018/015035, filed on Jan. 24, 2018, which is a continuation of application No. 15/475,636, filed on Mar. 31, 2017, now Pat. No. 10,299,493, which is a continuation of application No. 15/414,877, filed on Jan. 25, 2017, now Pat. No. 10,299,492, which is a continuation-in-part of application No. 14/132,486, filed on Dec. 18, 2013, now Pat. No. 9,585,417.

(60) Provisional application No. 61/837,414, filed on Jun. 20, 2013.

(51) Int. Cl.

| | |
|---|---|
| A23G 3/36 | (2006.01) |
| A23G 1/42 | (2006.01) |
| A23G 3/48 | (2006.01) |
| A23G 3/54 | (2006.01) |
| A23L 33/10 | (2016.01) |
| A23L 33/15 | (2016.01) |

(52) U.S. Cl.
CPC .............. *A23G 3/368* (2013.01); *A23G 1/42* (2013.01); *A23G 3/36* (2013.01); *A23G 3/364* (2013.01); *A23G 3/48* (2013.01); *A23G 3/54* (2013.01); *A23L 33/10* (2016.08); *A23L 33/15* (2016.08); *A23V 2002/00* (2013.01)

(58) Field of Classification Search
CPC . A23G 3/368; A23G 1/42; A23G 3/36; A23G 3/364; A23G 3/48; A23G 3/54; A23L 33/10; A23L 33/15; A23V 2002/00
See application file for complete search history.

(56) References Cited

U.S. PATENT DOCUMENTS

| | | | |
|---|---|---|---|
| 5,120,561 A | 6/1992 | Silva et al. | |
| 5,128,139 A | 7/1992 | Brown et al. | |
| 5,891,465 A | 4/1999 | Keller et al. | |
| 7,030,203 B2 | 4/2006 | Mosbey et al. | |
| 7,300,670 B2 | 11/2007 | Venus et al. | |
| 8,026,327 B2 | 9/2011 | Mosbey et al. | |
| 8,147,869 B2 | 4/2012 | Guilford et al. | |
| 8,282,977 B2 | 10/2012 | Bromley | |
| 8,337,931 B2 | 12/2012 | Bromley | |
| 2003/0109575 A1 | 6/2003 | Lambert et al. | |
| 2005/0142124 A1 | 6/2005 | Kaiser | |
| 2006/0099244 A1 | 5/2006 | Guilford | |
| 2008/0145502 A1 | 6/2008 | Vincieri et al. | |
| 2012/0149761 A1 | 6/2012 | Quay | |
| 2012/0277316 A1 | 11/2012 | Tillman et al. | |
| 2013/0287899 A1 | 10/2013 | Rifkin | |

OTHER PUBLICATIONS

Glutasome. Glutasome (TM). 2012. [retreived on Oct. 9, 2014]. Retrieved from the Internet. <URL:httpΛwww.glutasome.com/>entire document.

Zeolife. An Acute Toxicity Study of Glutasome by Oral Gavage in Rats. pp. 1-59, 2012. [retrieved on Oct. 9, 2014]. Retrieved from the Internet. <URL: http://zeolife.com/newsite/sites/default/files/Summary_Trials.pdf>. p. 43.

Search History: Limited Classification Search, dated Sep. 12, 2014, from corresponding International Patent Application PCT/US2014/043121.

*Primary Examiner* — Snigdha Maewall (74) *Attorney, Agent, or Firm* — Carrier, Shende & Associates P.C.; Fulchand P. Shende; Joseph P. Carrier (57) ABSTRACT

A gummy includes an inner portion, a formulation having a dispersion including an active ingredient contained in the inner portion; and an outer portion which surrounds the inner portion. The active ingredient includes one or more nutrients such as cannabinoids and dietary supplement. The dispersion includes one or more of a liposome emulsion; a nanoemulsion, and a microemulsion, each containing the active ingredient. A method of making such gummy having the cannabinoids and/or dietary supplement formulation in the inner portion thereof includes setting up a central filling apparatus having a shell syrup hopper, a central filling hopper, and a manifold branch and nozzle mechanism; filling the shell syrup hopper with the base material; filling the central filling hopper with the formulation; dispensing the base material and the formulation in the manifold branch and nozzle mechanism, and further into the gummy mold; and extracting the gummy from the gummy mold.

20 Claims, 3 Drawing Sheets

GUMMIES CONTAINING FORMULATIONS WITH ENHANCED DELIVERY MATRIX, AND METHODS OF MAKING SAME

CROSS-REFERENCE TO RELATED APPLICATIONS

This application is Continuation-in-part of U.S. application Ser. No. 17/007,706, filed on Aug. 31, 2020, which is a Continuation-in-part of U.S. application Ser. No. 16/522,021, filed on Jul. 25, 2019, which is a Continuation of International Application PCT/US2018/015035, filed on Jan. 24, 2018, which is a Continuation of U.S. application Ser. No. 15/475,636, filed on Mar. 31, 2017, which is a Continuation of U.S. application Ser. No. 15/414,877, filed on Jan. 25, 2017, which is a Continuation-in-part of the U.S. application Ser. No. 14/132,486, filed on Dec. 18, 2013, which claims priority to U.S. Provisional Patent Application No. 61/837,414, filed on Jun. 20, 2013. The entire subject matter of these priority documents, including specification claims and drawings thereof, is incorporated by reference herein.

BACKGROUND OF THE INVENTION

1. Field of the Invention

The present invention relates to gummies containing formulations in which active ingredients, including cannabinoids (obtained from natural and/or synthetic sources), e.g., cannabidiol (CBD), tetrahydrocannabinol (THC), and/or dietary supplements, are incorporated in liposomal vesicles, and/or are prepared in the forms of nanoemulsion and/or microemulsion, all of which may be physically coated and/or surrounded by a polymer, including a biopolymer for prolonging circulatory time of dietary supplemental compositions in bloodstream of humans and animals when ingested, and to methods of making the same. More particularly, the present invention relates to gummies containing the formulations in which the active ingredient such as cannabinoids and/or dietary supplements along with Sodium (Na), Calcium (Ca), Potassium (K), alginate are encapsulated actives, and lipids is incorporated and/or encapsulated in one or more of liposomal vesicles, droplets of nanoemulsion or microemulsion, and in which such liposomes/droplet may be coated and/or surrounded by one or multiple layers or compositions coating material including polysaccharides and biopolymers including starches, modified starches, also gums, alginates, calcium carbonates, amorphous silicon dioxide, mono-diglycerides of fatty acids, Sorbitan laurate, acacia fibers, gum Arabic, maltodextrins, including beta and gamma dextrin's along with cyclo-dextrin's, of and even polymers such as polymer of ethylene oxide, e.g., polyethylene glycol, poloxamer 184-188 end chain block polymers a biopolymer, e.g., fenusterol derived from fenugreek seeds, chitosan derived from marine life, such as shrimp, crabs, mushroom and a combination thereof; and to methods of making such gummies.

2. Background of the Invention

For decades, the absorption of formulations including nutrients/active ingredients—such as, vitamins, minerals, plant based compounds including cannabinoids—has somewhat remained controversial and a matter of considerable investigation. A nutrient, such as cannabinoids, is a component that may be used for surviving and growing of humans and animals. It is generally known that when dietary supplements, whether vitamins, minerals or cannabinoids are ingested, only a fraction of the stated dose of active ingredient on the label of these products is actually absorbed in humans and animals. The importance of liposome delivery is to protect the active in the digestive tract where it is absorbed in the lower part of the digestive system and is protected somewhat to the harsh digestive juices in the stomach, This level of protection helps to keep the sensitive vitamins from prematurely degrading in the stomach the liposomal protection qualities helps to delivery more actives/nutrients on a gram to gram basis more than non coated/liposomal nutrients. It appears that so much of the product may be lost when phagocytes begin attacking the digestive system. The phagocytes cells may perceive nutrients to be foreign invaders. In other words, a stated dose of the nutrient may have very little bioavailability.

Also during manufacturing of gummies, the inner and outer portions are heated to high temperatures to temper and sterilize the active components and during this process the nutrients are denatured and damaged and this also is another aspect of the low potency and vitamin stability seen in gummy manufacturing. The method of making gummies according to the present invention overcomes the disadvantages known in the art because it uses a cold fill and cold nutrient processing technique and the gummies are filled cold temperature. Thus, the stability is much greater due to the low temperatures used in applicants' manufacturing technique of placing the formulation (liquid or powder form) inside the gummy. The active ingredients are preserved with food grade preservatives and are manufactured in acold process and the filling/dosing of the gummy at time of manufacture is done to in hot and cold process with the outer shell being at a temperature ranging from 45° C. to 90° C. and the internal liquid is maintained and injected into the cavity of the outer shell gummy at a temperature of between 5° C. to 60° C. and then the gummy is allowed to cool and then ejected from the mold and then coated with a wax and or sugar/powder coating to help with sticking together or it is packaged individually Further, there are known nutrient gummies (vitamins, minerals and cannabinoids) for humans. However, when gummies are ingested, nutrients included in the gummies are not designed to be present in the bloodstream for an extended period of time so as to increase bioavailability thereof. Accordingly, there is a need to make gummies containing a formulation including cannabinoids and dietary supplements, which are sustained in bloodstreams for extended time periods thereby providing increased bioavailability of the nutrients such as vitamins and minerals. The technology disclosed in the present invention allows for fast acting and slow acting/long term release of nutrients into the blood stream along with increasing the overall absorption of that nutrient as a whole.

The present invention has been made to overcome the drawbacks of the existing gummies containing formulations including cannabinoids cannabidiol (CBD), tetrahydrocannabinol (THC)) and dietary supplements and methods of making the gummies containing such formulations. Accordingly, it is one of the objects of the present invention to provide gummies containing formulations including one or more active nutrients, such as Cannabinoids, vitamins, minerals, antioxidants (e.g., reduced glutathione, vitamin E, D-Alpha Toccopherol, Toccopheroal acetate, toccopherols, toccotrienols, butylated hydroxytoluene (BHT), Vitamin A, and other oil soluble antioxidants), with enhanced delivery matrix and having increased bioavailability, absorption and shelf life, and methods of making the same.

SUMMARY OF THE INVENTION

In order to achieve the above objects, the present invention provides a gummy containing a formulation including one or more of Cannabinoids, vitamins, Mineral Amino Acids and other nutrients and active ingredients, along with monographed materials for over the counter (OTC) consumption or use, and methods of making same.

In this disclosure, the term "cannabinoids" are a group of psychoactive and non-psychoactive compounds which have an activity on cannabinoid receptors in cells to repress neurotransmitter release in the brain. The term is meant to encompass cannabinoids which are obtained from natural sources by various processes of treatment or extraction, as well as to synthetically obtained cannabinoids. The cannabinoid may be selected from one or more of cannabidiol (CBD), tetrahydrocannabinol (THC), cannabigerolic acid (CBGA), cannabigerolic acid monomethylether (CBGAM), cannabigerol (CBG), cannabigerol monomethylether (CBGM), cannabigerovarinic acid (CBGVA), cannabigerovarin (CBGV), cannabichromenic acid (CBCA), cannabichromene (CBC), cannabichromevarinic acid (CBCVA), cannabichromevarin (CBCV), cannabidiolic acid (CBDA), cannabidiol (CDB), cannabidiol monomethylether (CBDM), cannabidiol-C4 (CBD-C4), cannabidivarinic acid (CBDVA), cannabidiorcol (CBD-C1), delta-9-tetrahydrocannabinolic acid A (THCA-A), delta-9-tetrahydrocannabinolic acid B (THCA-B), delta-9-tetrahydrocannabinol (THC), delta-9-tetrahydrocannabinolic acid-C4 (THCA-C4), delta-9-tetrahydrocannabinol-C4 (THCA-C4), delta-9-tetrahydrocannabivarinic acid (THCVA), delta-9-tetrahydrocannabivarin (THCV), delta-9-tetrahydrocannabiorcolic acid (THCA-C1), delta-9-tetrahydrocannabiorcol (THC-C1), delta-7-cis-iso-tetrahydrocannabivarin, delta-8-tetrahydrocannabinolic acid A (Δ8-THCA), delta-8-tetrahydrocannabinol (Δ8-THC), cannabicyclolic acid (CBLA), cannabicyclol (CBL), cannabicyclovarin (CBLV), cannabielsoic acid A (CBEA-A), cannabielsoic acid B (CBEA-B), cannabielsoin (CBE), cannabinolic acid (CBNA), cannabinol (CBN), cannabinol methylether (CBNM), cannabinol-C4 (CBN-C4), cannabivarin (CBV), cannabinol-C2 (CBN-C2), cannabiorcol (CBN-C1), cannabinodiol (CBND), cannabinodivarin (CBVD), cannabitriol (CBT), 10-ethoxy-9-hydroxy-delta-6a-tetrahydrocannabinol, 8,9-dihydroxy-delta-6a-tetrahydrocannabinol, cannabitriolvarin (CBTV), ethoxy-cannabitriolvarin (CBTVE), dehydrocannabifuran (DCBF), cannabifuran (CBF), cannabichromanon (CBCN), cannabicitran (CBT), 10-oxo-delta-6a-tetrahydrocannabinol (OTHC), delta-9-cis-tetrahydrocannabinol (cis-THC), 3,4,5,6-tetrahtdro-7-hydroxy-α-α-2-trimethyl-9-n-propyl-2,6-methano-2H-1-benzo xocin-5-methanol (OH-iso-HHCV), cannabiripsol (CBR), trihydroxy-delta-9-tetrahydroxycannabinol (triOH-THC), and any other cannabinoid.

A gummy according one aspect of the present invention includes an inner portion; a formulation having a dispersion including an active ingredient comprising one or more nutrients including at least one of cannabinoids (e.g., cannabidiol (CBD), tetrahydrocannabinol (THC)) and dietary supplement contained in the inner portion; and an outer portion which surrounds the inner portion. The dispersion comprising at least one of (1) a liposome emulsion comprising a plurality of liposomal vesicles and phospholipid contained in said liposomal vesicles having said active ingredient incorporated therein; (2) a nanoemulsion comprising a plurality of droplets containing the active ingredient; and (3) a microemulsion comprising a plurality of droplets containing the active ingredient.

The liposomal vesicles of the liposome emulsion and droplets of the nanoemulsion and microemulsion may be coated by a coating material which surrounds at least one of the liposomal vesicle of the liposome emulsion, the droplets of the nanoemulsion and the droplets of the microemulsion without being attached thereto and without forming a part thereof.

Sizes of the droplets in the microemulsion range from 90 nm to 900 nm. Sizes of the droplets in the nanoemulsion range from 10 nm to 150 nm. Sizes of the liposomal vesicles in the liposome emulsion range from 10 nm to 900 nm.

When used, the coating material provides the coating for the liposomal vesicles of the liposome emulsion, and droplets of the microemulsion and the nanoemulsion in one or multiple layers. The coating material includes one of compositions of polysaccharides and biopolymers including starches, modified starches, also gums, alginates, calcium carbonates, amorphous silicon dioxide, mono-diglycerides of fatty acids, Sorbitan laurate, acacia fibers, gum Arabic, maltodextrins, including beta and gamma dextrin's along with cyclo-dextrin's, of and even polymers such as polymer of ethylene oxide, e.g., polyethylene glycol, poloxamer 184-188 end chain block polymers a biopolymer, e.g., fenusterol derived from fenugreek seeds, chitosan derived from marine life, such as shrimp, crabs, mushroom, a polyethylene glycol (PEG) identified with Registry Number 25322-68-3 in the Chemical Abstract Service of the American Chemical Society and a combination thereof. Here, the phrase "combination thereof" means two or more of these coating materials.

As discussed herein, the coating material is free flowing in the dispersion such that the liposomal vesicles of the liposome emulsion and/or droplets of the microemulsion/nanoemulsion are surrounded by the coating material without being attached to the liposomal vesicles/droplets and without forming part of the liposomal vesicles/droplets and without affecting weight of the liposomal vesicles/droplets.

The active ingredients, in addition to cannabinoids, may further include one or more of reduced glutathione (GSH), vitamin A, vitamin B1 (thiamine), vitamin B2 (riboflavin), vitamin B3 (niacin), vitamin B5 (pantothenic acid), vitamin B6 (pyridoxine), vitamin B7 (biotin), vitamin B9 (folic acid), vitamin B12 (cobalamin), vitamin C (ascorbic acid), vitamin D, vitamin E, vitamin K, trace mineral iron, trace mineral zinc, trace mineral iodine, trace mineral copper, trace mineral manganese, trace mineral fluoride, trace mineral chromium, trace mineral selenium, trace mineral molybdenum, and trace mineral boron, and may also include Amino acids, Monographed over the Counter (OTC) drugs, oil and water soulbele antioxidants, hydroxy tyrosol, herbal extracts, nutriceuticals, vitamin E and all of its derivatives (mixed tocopherols and tocotrienols), caffeine, salicylic acid, mono glycerides, fatty acids, essential fatty acids (EFA), Docosahexaenoic acid (DHA), chelated minerals, Pyrroloquinoline quinone (PQQ), Coenzyme Q (CQ10), Astaxanthin, Spirulina, Dietary Supplement Health and Education Act (DSHEA) Nutrients, Chocolate and a combination thereof. Here, the phrase "combination thereof" means two or more of these nutrients. The active ingredient may include additional nutrients not listed above.

The formulation may further include unpleasant smell or taste reducing agent and/or heat shielding agent, such as, beta dextrin, poly and cluster dextrins, silicon dioxide, modified starches, maltodextrins cyclodextrin-a and cyclodextrin-c. One or more of these agents counter (mask) fowl, unpleasant smell or taste of active ingredients. The cyclodextrin-a and cyclodextrin-c also provide heat shield to the actives in while preparing gummies which includes inner portion having the cannabinoids and/or dietary supplement formulation, and an outer portion formed of edible material and may optionally include one or more of additional active ingredients, such as vitamin C and/or the cannabinoids and/or dietary supplement formulation.

The methods of making various formulations including active ingredients are discussed in the U.S. application Ser. Nos. 16/522,021, 15/475,636, 15/414,877, and 14/132,486, which incorporated hereinby reference.

A method of making a gummy containing cannabinoids and/or dietary supplement formulation discussed above according to the present invention generally includes the method steps of setting up a central filling apparatus having a shell syrup hopper, a central filling hopper, a shell syrup strike piston disposed shell syrup hopper, a central filling strike piston disposed in the central filling hoper; and a manifold branch and nozzle mechanism connected with each of the shell syrup strike piston and the central filling strike piston, and a gummy mold; filling the shell syrup hopper with a base material and/or maintaining/heating the base material at/to a first temperature of 45° C. to 90° C.; filling the central filling hopper with the cannabinoids and/or dietary supplement formulation and maintaining/heating the cannabinoids and/or dietary supplement formulation at a second temperature of 5° C. to 50° C.; dispensing the base material in the manifold branch and nozzle mechanism by using the shell syrup strike piston; dispensing the cannabinoids and/or dietary supplement formulation in the manifold branch and nozzle mechanism by using the central filling strike piston; further dispensing said base material and said formulation in the gummy mold such that the formulation is surrounded by the base material thereby forming a gummy in the gummy mold; decoupling the gummy mold; cooling of the gummy mold; and extracting the gummy from the gummy mold. Such cold fill aspect of making gummies according to the present invention provides overall stability of the active ingredients including cannabinoids and/or dietary supplement nutrients contained in the inner portion of the gummies. The overall stability the nutrients are preserved better because they are not exposed to heat over 50° C.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Gummies are chewable pieces, mostly made of sweet material. The gummies have a base material including gelatin or pectin or amylose starch or a mixture of all three components. The base material may include cannabinoids and/or dietary supplement formulation.

The present invention provides gummies containing a cannabinoids and/or dietary supplement formulation, which may be in a liquid or gel form. The formulation includes nutrients, active ingredients, cannabinoids or a combination thereof incorporated in a distinctive matrix. The formulations can be in the form of multiple types of emulsions and encapsulated liquid emulsions including microemulsions and nanoemulsions, alginate encapsulated liquid emulsions, and liposomal emulsions from a standard definition.

In this disclosure, the cannabinoids are a group of psychoactive and non-psychoactive compounds which have an activity on cannabinoid receptors in cells to repress neurotransmitter release in the brain. The term is meant to encompass cannabinoids which are obtained from natural sources by various processes of treatment or extraction, as well as to synthetically obtained cannabinoids. The cannabinoid may be selected from one or more of cannabidiol (CBD), tetrahydrocannabinol (THC), cannabigerolic acid (CBGA), cannabigerolic acid monomethylether (CBGAM), cannabigerol (CBG), cannabigerol monomethylether (CBGM), cannabigerovarinic acid (CBGVA), cannabigerovarin (CBGV), cannabichromenic acid (CBCA), cannabichromene (CBC), cannabichromevarinic acid (CBCVA), cannabichromevarin (CBCV), cannabidiolic acid (CBDA), cannabidiol (CDB), cannabidiol monomethylether (CBDM), cannabidiol-$C_4$ (CBD-$C_4$), cannabidivarinic acid (CBDVA), cannabidiorcol (CBD-$C_1$), delta-9-tetrahydrocannabinolic acid A (THCA-A), delta-9-tetrahydrocannabinolic acid B (THCA-B), delta-9-tetrahydrocannabinol (THC), delta-9-tetrahydrocannabinolic acid-$C_4$ (THCA-$C_4$), delta-9-tetrahydrocannabinol-$C_4$ (THCA-$C_4$), delta-9-tetrahydrocannabivarinic acid (THCVA), delta-9-tetrahydrocannabivarin (THCV), delta-9-tetrahydrocannabiorcolic acid (THCA-$C_1$), delta-9-tetrahydrocannabiorcol (THC-$C_1$), delta-7-cis-iso-tetrahydrocannabivarin, delta-8-tetrahydrocannabinolic acid A ($\Delta^8$-THCA), delta-8-tetrahydrocannabinol ($\Delta^8$-THC), cannabicyclolic acid (CBLA), cannabicyclol (CBL), cannabicyclovarin (CBLV), cannabielsoic acid A (CBEA-A), cannabielsoic acid B (CBEA-B), cannabielsoin (CBE), cannabinolic acid (CBNA), cannabinol (CBN), cannabinol methylether (CBNM), cannabinol-$C_4$ (CBN-$C_4$), cannabivarin (CBV), cannabinol-$C_2$ (CBN-$C_2$), cannabiorcol (CBN-$C_1$), cannabinodiol (CBND), cannabinodivarin (CBVD), cannabitriol (CBT), 10-ethoxy-9-hydroxy-delta-6a-tetrahydrocannabinol, 8,9-dihydroxy-delta-6a-tetrahydrocannabinol, cannabitriolvarin (CBTV), ethoxy-cannabitriolvarin (CBTVE), dehydrocannabifuran (DCBF), cannabifuran (CBF), cannabichromanon (CBCN), cannabicitran (CBT), 10-oxo-delta-6a-tetrahydrocannabinol (OTHC), delta-9-cis-tetrahydrocannabinol (cis-THC), 3,4,5, 6-tetrahtdro-7-hydroxy-α-a-2-trimethyl-9-n-propyl-2,6-methano-2H-1-benzo xocin-5-methanol (OH-iso-HHCV), cannabiripsol (CBR), trihydroxy-delta-9-tetrahydroxycannabinol (triOH-THC), and any other cannabinoid. As a natural source, the cannabinoids of the present invention may include phytocannabinoids which are cannabinoids that occur naturally in the cannabis plant. The phytocannabinoid is any cannabinoid produced in the trichomes (fine outgrowths or appendages) of a cannabis plant.

The formulations used in the present invention include one or more of the cannabinoids and/or dietary supplements. The cannabinoids may be selected from one or more of cannabidiol (CBD), tetrahydrocannabinol (THC), cannabigerolic acid (CBGA), cannabigerolic acid monomethylether (CBGAM), cannabigerol (CBG), cannabigerol monomethylether (CBGM), cannabigerovarinic acid (CBGVA), cannabigerovarin (CBGV), cannabichromenic acid (CBCA), cannabichromene (CBC), cannabichromevarinic acid (CBCVA), cannabichromevarin (CBCV), cannabidiolic acid (CBDA), cannabidiol (CDB), cannabidiol monomethylether (CBDM), cannabidiol-$_{c4}$ (CBD-$_{c4}$), cannabidivarinic acid (CBDVA), cannabidiorcol (CBD-$_{c1}$), delta-9-tetrahydrocannabinolic acid A (THCA-A), delta-9-tetrahydrocannabinolic acid B (THCA-B), delta-9-tetrahydrocannabinol (THC), delta-9-tetrahydrocannabinolic acid-$_{c4}$ (THCA-$_{c4}$), delta-9-tetrahydrocannabinol-$_{c4}$ ($_{THCA-c4}$), delta-9-tetrahydrocannabivarinic acid (THCVA), delta-9-tetrahydrocannabivarin (THCV), delta-9-tetrahydrocannabiorcolic acid (THCA-$_{c1}$), delta-9-tetrahydrocannabiorcol (THC-$_{c1}$), delta-7-cis-iso-tetrahydrocannabivarin, delta-8-tetrahydrocannabinolic acid A ($\Delta^8$-THCA), delta-8-tetrahydrocannabinol ($\Delta^8$-THC), cannabicyclolic acid (CBLA), cannabicyclol (CBL), cannabicyclovarin (CBLV), cannabielsoic acid A (CBEA-A), cannabielsoic acid B (CBEA-B), cannabielsoin (CBE), cannabinolic acid (CBNA), cannabinol (CBN), cannabinol methylether (CBNM), cannabinol-$_{c4}$ (CBN-$_{c4}$), cannabivarin (CBV), cannabinol-$_{c2}$ (CBN-$_{c2}$), cannabiorcol (CBN-$_{c1}$), cannabinodiol (CBND), cannabinodivarin (CBVD), cannabitriol (CBT), 10-ethoxy-9-hydroxy-delta-6a-tetrahydrocannabinol, 8,9-dihydroxy-delta-6a-tetrahydrocannabinol, cannabitriolvarin (CBTV), ethoxy-cannabitriolvarin (CBTVE), dehydrocannabifuran (DCBF), cannabifuran (CBF), cannabichromanon (CBCN), cannabicitran (CBT), 10-oxo-delta-6a-tetrahydrocannabinol (OTHC), delta-9-cis-tetrahydrocannabinol (cis-THC), 3,4,5,6-tetrahtdro-7-hydroxy-α-a-2-trimethyl-9-n-propyl-2,6-methano-2H-1-benzo xocin-5-methanol (OH-iso-HHCV), cannabiripsol (CBR), trihydroxy-delta-9-tetrahydroxycannabinol (triOH-THC), and any other cannabinoid.

Further, the active ingredients may additionally include one of reduced glutathione, vitamin A, vitamin $B_1$ (thiamine), vitamin $B_2$ (riboflavin), vitamin $B_3$ (niacin), vitamin $B_5$ (pantothenic acid), vitamin $B_6$ (pyridoxine), vitamin $B_7$ (biotin), vitamin $B_9$ (folic acid), vitamin $B_{12}$ (cobalamin), vitamin C (ascorbic acid), vitamin D, vitamin E, vitamin K, trace mineral iron, trace mineral zinc, trace mineral iodine, trace mineral copper, trace mineral manganese, trace mineral fluoride, trace mineral chromium, trace mineral selenium, trace mineral molybdenum, and trace mineral boron, Amino Acids, and those of the additional ingredients listed hereinabove, and a combination thereof.

The distinctive matrix of active ingredients, e.g., cannabinoids (cannabidiol (CBD), tetrahydrocannabinol (THC)) incorporated in liposomal vesicles, or produced in the form of droplets of microemulsion and nanoemulsion facilitate efficient oral intake and absorption of powerful nutrients including antioxidants into a human body or an animal body for an extended time period. The active ingredients such as cannabinoids is incorporated, i.e., enclosed in liposomal vesicles of phospholipids, and may be produced in microemulsion or nanoemulsion forms. The liposomal vesicles may be covered by providing a free flowing barrier coating a polymer including a biopolymer (derived from fenugreek seeds), starches, gums, alginates, gum Arabic, xanthan gum, polysaccharides, and a combination thereof. The polymer provides a physical barrier coating to the liposomal vesicles.

In other words, the polymer acts as a liner to liposomal vesicles. However, polymer is not attached to the liposomal vesicles or droplets of the microemulsion and nanoemulsions. The liposomal vesicles may be of various sizes and shapes. Generally, the liposomal vesicles are about 40-400 μm in diameter. Various flavors, such as oil phase flavors and aqueous phase flavor, may be added to the formulations. Generally, the formulations may include one or more of oil phase flavor such as a citrus flavor, and aqueous phase flavor such as a pineapple flavor and a watermelon flavor. The cannabinoids and/or dietary supplement formulation may also include polysaccharide, such as gum arabic, and glycerin.

Structure of Gummy

Figure 1:
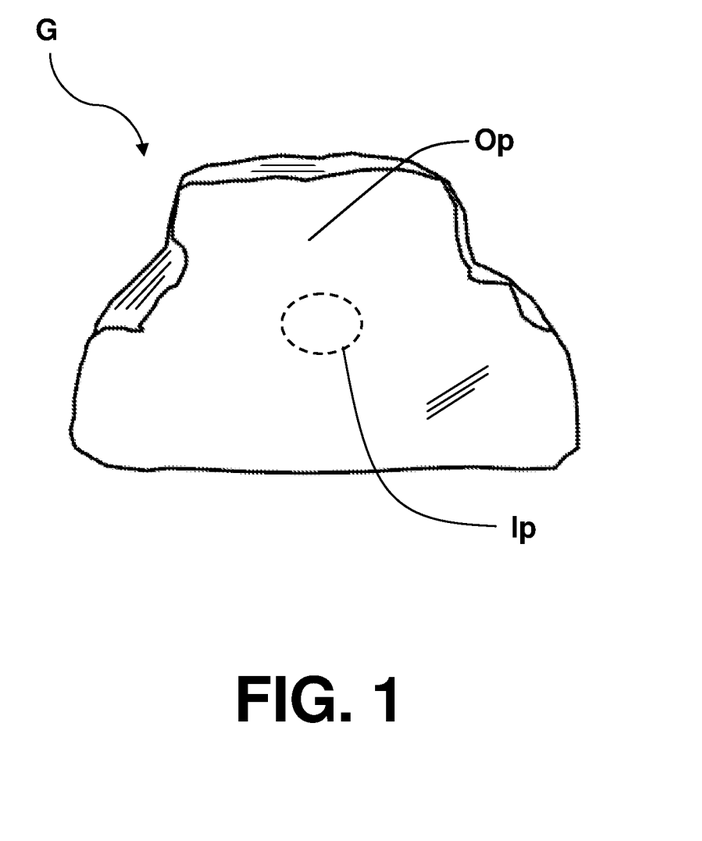
FIG. 1 is a view of a gummy according to the present invention.

As shown in FIG. 1, a gummy according the present invention includes an inner portion Ip, and an outer portion Op which surrounds the inner portion Ip. The outer portion Op includes the base material. e.g., pectin. The base material may include cannabinoids and/or dietary supplement formulation.

Pectin is preferred by vegetarians—people whose diets mainly contain various levels of fruits, vegetables, grains, pulses, nuts and seeds—since it does not include any material derived from animals or minimally includes material from marine life, e.g., chitosan. Pectin is derived from fruits such as apples, pears, guavas, quince, plums, gooseberries and oranges. The shape of the gummy shown in FIG. 1 is for illustration purpose only. The gummy may have different shapes. Gummies maybe made from plant or animal based materials and the inner liquid may contain plant and animal ingredients, e.g., Vitamin D derived from Sheep's wool Lanolin. The outer portion of the gummy maybe made of pectin, gelatin, collagen, starches, fibers, chocolate, or More specifically, according to the present invention, the gummy G includes the inner portion Ip, the cannabinoids and/or dietary supplement formulation having a dispersion including a plurality of liposomal vesicles and/or micro or nano based emulsions contained in the inner portion Ip; and the outer portion Op which surrounds the inner portion Ip containing the cannabinoids and/or dietary supplement formulation.

The cannabinoids and/or dietary supplement formulation is arranged/disposed in the inner portion Ip by using a method of making gummy discussed herein. As discussed above, the formulation may include cannabinoids and/or dietary supplement; phospholipid contained in the liposomal vesicles; and an optional coating material (as disclosed herein) wherein the cannabinoids and/or dietary supplement is incorporated within the liposomal vesicles, and/or in droplets of the microemulsion and nanoemulsion, and the coating material (if used) is free flowing in the dispersion such that the liposomal vesicles and/or the droplets of the microemulsion and/or nanoemulsion are surrounded by the coating material without being attached to the liposomal vesicles/droplets and without forming part of the liposomal vesicles/droplets and without affecting weight of the liposomal vesicles/droplets. In the liposomal vesicles, the phospholipid may include plant and or animal origin also form fish, soy, sunflower, egg, and synthetic phospholipid complex's sunflower lecithin.

The inner portion generally has a volume of 0.1 ml-8 milliliter (ml). However, more preferably, the inner portion has a volume of about 0.5-1 ml which accommodates up to 1 mg to 100 mg of the active ingredient in the cannabinoids and/or dietary supplement formulation. The cannabinoids used in the present invention may be natural compounds found in plants or may be synthetically derived.

The volume of the inner portion Ip may be increased or decreased depending on active ingredients. Depending on the size of the gummy, the inner portion may have volume of less than 1 ml, or more than 1 ml, may up to 5 ml. Thus, the inner portion may accommodate up to 150 mg of cannabinoids and/or dietary supplement. However, the preferable size is up to 1 ml which accommodates up to 10-30 mg of cannabinoids and/or dietary supplement.

The outer portion Op may be made of any edible material including hydrocolloids. A nutrient pre-mix, e.g., vitamin pre-mix or cannabinoids and/or dietary supplement formulation can be added into the outer portion Op. Thus, the outer portion Op may include one or more active ingredients.

It may be noted that by doing a core based product filling, i.e., creating inner portion that contains/filled with the cannabinoids and/or dietary supplement formulation, less material is lost so that 7-12% overage (extra material) on the cannabinoids and/or dietary supplement formulation can be achieved.

The cannabinoids and/or dietary supplement formulation may include other active ingredients, such as vitamin C (ascorbic acid), and other nutrients listed herein. When vitamin C is used in the formulation, an illustrative composition of the formulation includes the cannabinoids in the amount of about 10 mg, and vitamin C in the amount of about 25 mg-150 mg.

A composition of the cannabinoids and/or dietary supplement formulation, for example, may include 1 mg, 10 mg, 25 mg, 50 mg 58 mg of cannabidiol (CBD) and/or, tetrahydrocannabinol (THC); sunflower lecithin in the amount of about 10 mg-125 mg, said sunflower lecithin being the phospholipid; medium-chain triglycerides in the amount of 50 mg; sodium benzoate in the amount of 2 mg; potassium sorbate in the amount of 2 mg; citric acid in the amount of about 2 mg; gum arabic in the amount of about 1597 mg; stevia in the amount of about 105 mg; orange flavor in the amount of about 140 mg and pineapple flavor. Further, the cannabinoids and/or dietary supplement formulation contained in the inner portion Ip of the gummy G includes cyclodextrin-a and cyclodextrin-c.

An outermost portion of the outer portion is coated with the cannabinoids and/or dietary supplement formulation, or some other edible composition in a powdered form.

Apparatus for Making Gummies

Figure 2:
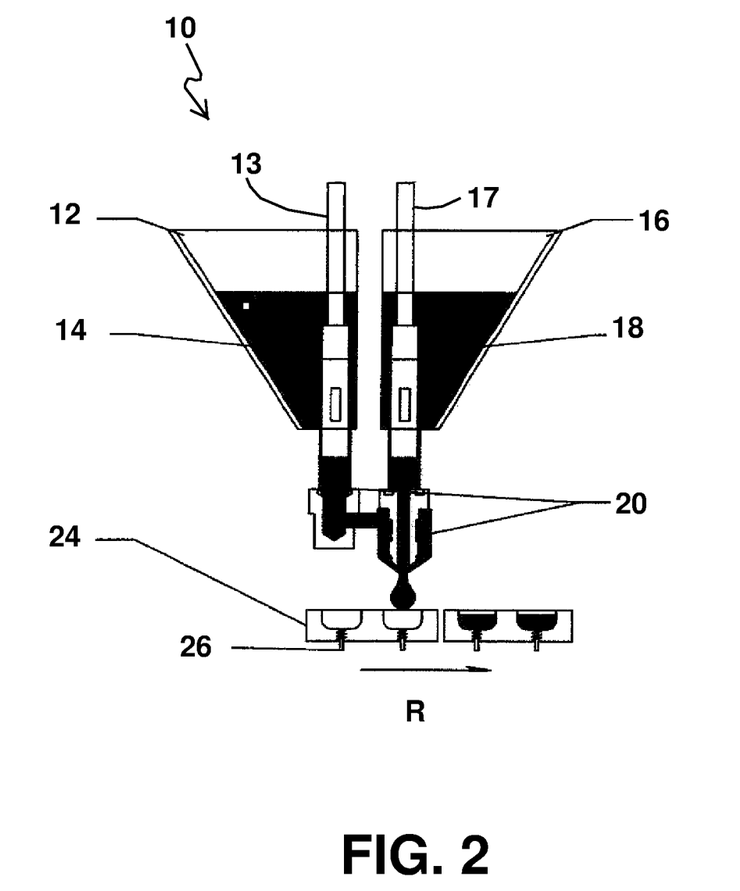
FIG. 2 is a schematic view of a central filling apparatus used for making gummies.

A central filling apparatus 10, shown in FIG. 2, is used for making gummies of the present invention. The central filling apparatus 10 includes a shell syrup hopper 12 for receiving and dispensing shell syrup (base material) 14 and a central filling hopper 16 for receiving and dispensing central filling material (i.e., cannabinoids (e.g., cannabidiol (CBD), tetrahydrocannabinol (THC)) and/or dietary supplement formulation) 18. A shell syrup strike piston 13 disposed in the shell syrup hopper 12. A central filling material piston 17 disposed in the central filling hopper 16. A manifold branch and nozzle mechanism 20 is used for dispensing shell syrup/base material and the cannabinoids and/or dietary supplement formulation. A candy mold/gummy mold 24 is arranged at a position below lower portions of the shell syrup hopper 12 and the central filling hopper 16. A de-moulding pin 26 is used for demoulding the gummies. The gummy mold 24 is aluminum teflon coated. The shell syrup strike piston 13 is configured to dispense shell syrup 14. The central filling material piston 17 is configured to dispense central filing material 18.

The shell syrup (e.g., gummies base material such as pectin derived from fruits) 14 is placed in/supplied to the shell syrup hopper 12. The shell syrup 14 in the shell syrup hopper 12 is at a first temperature, which is about 65° C.-90° C. The central filling material (e.g., cannabinoids and/or dietary supplement formulation) 18 is placed in/supplied to central filling hopper 16, and heated to/maintained at a second temperature, which is about 55° C.

The two shell syrup and central filling hoppers 12, 16 work independently of each other. But both masses (base material and cannabinoids and/or dietary supplement formulation) 14, 18 end up running through one universal nozzle which has multiple pipe lines.

The cyclodextrin-a and cyclodextrin-c included in the cannabinoids and/or dietary supplement formulation act as a heat shield which in turn helps prevent the heat from damaging the active ingredients in the formulation during the process of making gummies. The cyclodextrin-a and cyclodextrin-c can be replaced with the other heat shielding agents. Vitamin E may be added to the cannabinoids and/or dietary supplement formulation to slow down oxidation of the formulation.

The shell syrup material flowing through the shell syrup hopper 12 deposits shell syrup material 14 in the strike piston 13 but at a separate temperature (i.e., the first temperature of about 80° C.) than the temperature (i.e., the second temperature of about 30° C.) of the filling material (cannabinoids and/or dietary supplement formulation) 18 in the central filling hopper 16. Generally, within 4 minutes of dispending the cannabinoids and/or dietary supplement formulation in the mold 24, the cannabinoids and/or dietary supplement formulation 18 is cooled down to a room temperature as there is an automatic cooling system that the mold runs through. The mold 24 moves in the direction shown by R. Then the material is deposited on a tray and left to cure for about 48 hours.

In other words, the manifold branch and nozzle mechanism 20 and in combination with strike pistons 13, 17 deposits shell syrup 14 and filling material (cannabinoids and/or dietary supplement formulation) 18 in the mould 24 such that the temperature of shell syrup 14 is higher than the temperature of the cannabinoids and/or dietary supplement formulation 18.

As shown in FIG. 1, the gummies G made in this manner include the inner portion Ip, and the outer portion Op which surrounds the inner portion. The inner portion Ip includes the cannabinoids and/or dietary supplement formulation having a dispersion including one or more a plurality of liposomal vesicles, a plurality of droplets of microemulsion and plurality of droplets of nanoemulsion.

Before placing the cannabinoids and/or dietary supplement formulation in the central filling apparatus, the cannabinoids and/or dietary supplement formulation dispersion may be filtered using a tangential flow technique which washes out outer periphery of liposomal vesicles so as to remove said inactive ingredient contained outside the liposomal vesicles/droplets of the microemulsion/nanoemulsion. However, it may be noted that, tangential flow does not take out coating material which is free flowing in the dispersion such that the liposomal vesicles/droplets remain surrounded by the coating material without being attached to the liposomal vesicles/droplets and without forming part of the liposomal vesicles/droplets and without affecting weight of liposomal vesicles/droplets. The outer portion Op is formed of an edible material such pectin, and may include active ingredients including the cannabinoids and/or dietary supplement formulation.

Method of Making Gummies

Figure 3:
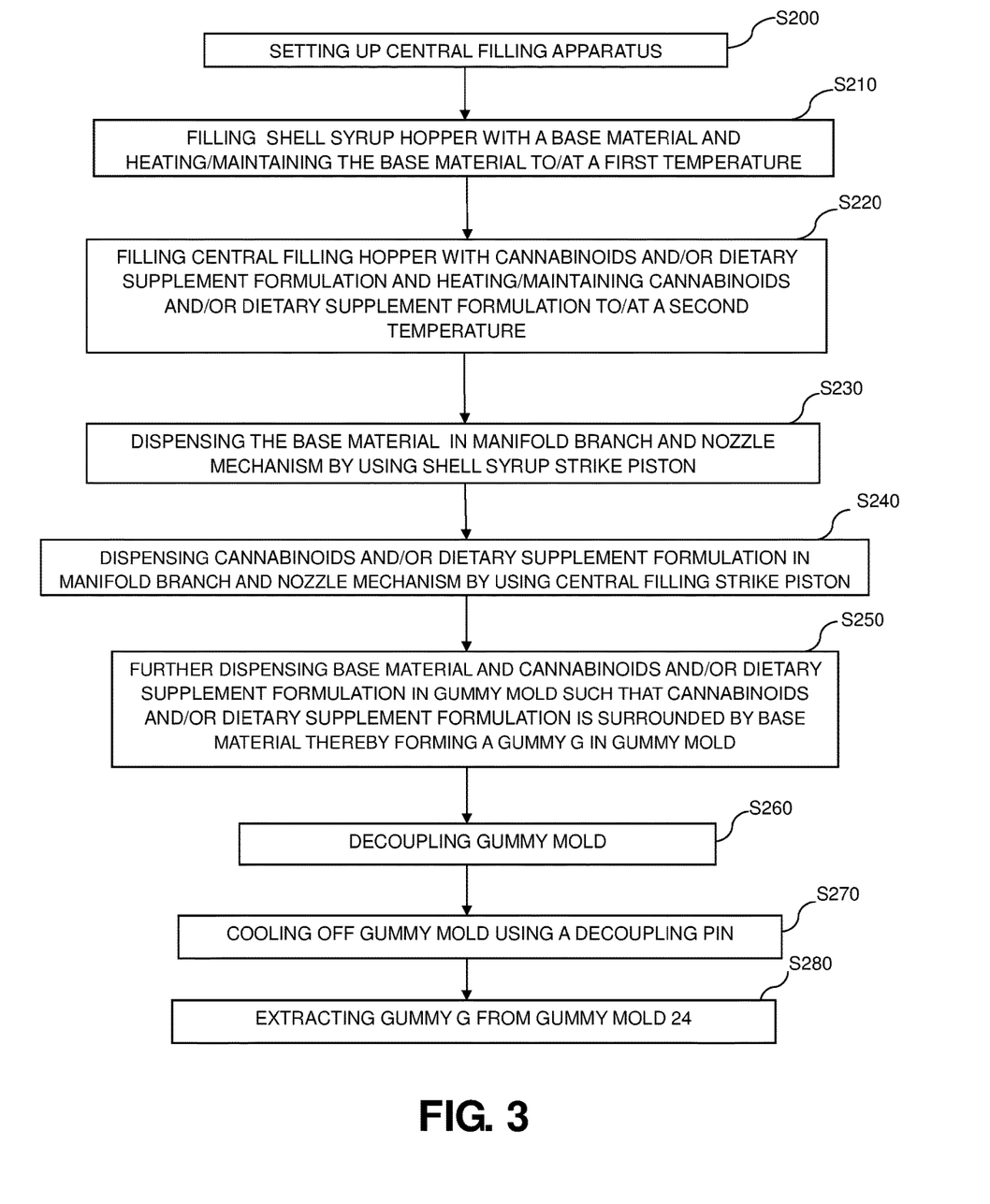
FIG. 3 is a flowchart showing method steps of making gummies.

The method of making a gummy containing the cannabinoids and/or dietary supplement formulation is illustrated in FIG. 3.

The method of making the gummy includes the method steps of setting up the central filling apparatus 10 (STEP S200), the central filling apparatus 10 having the shell syrup hopper 14, the central filling hopper 16, the shell syrup strike piston 13 disposed shell syrup hopper 14, a central filling strike piston 17 disposed in the central filling hoper 16; and the manifold branch and nozzle mechanism 20 connected with each of the shell syrup strike piston 13 and the central filling strike 17 piston, and the gummy mold 26; filling the shell syrup hopper 14 with a base material (e.g., pectin) and maintaining and/or heating the base material at a first temperature (of about 80° C.) (STEP S210); filling the central filling hopper 16 with the cannabinoids and/or dietary supplement formulation and maintaining and/or heating the cannabinoids and/or dietary supplement formulation to a second temperature (of about 30° C.) (STEP S220); dispensing the base material in the manifold branch and nozzle mechanism 20 by using the shell syrup strike piston 13 (STEP S230); dispensing the cannabinoids and/or dietary supplement formulation in the manifold branch and nozzle mechanism 20 by using the central filling strike piston 17 (STEP S240); further dispensing the base material and the cannabinoids and/or dietary supplement formulation in the gummy mold 24 such that the formulation is surrounded by the base material thereby forming a gummy G in the gummy mold 24 (STEP S250); decoupling the gummy mold 24 (STEP S260); cooling off the gummy mold using the decoupling pin 26 (STEP S270); and extracting the gummy G from the gummy mold 24 (STEP S280). The method may additionally include the step of coating an outermost portion of the outer portion with the dispersion, or some other edible, nutrient composition.

In the method of making the gummy the first temperature is always greater than the second temperature; and the first temperature is about 80° C. and the second temperature is about 30° C. As discussed above, the cannabinoids and/or dietary supplement formulation includes cyclodextrin-a and cyclodextrin-c, which provide heat shield to the cannabinoids and/or dietary supplement formulation from pectin (outer portion Op of the gummies G) since it compartmentalize the gummy G. The cyclodextrin-a and cyclodextrin-c may be replaced with other heat shielding agents.

The above discussed method provides the gummy in which the inner portion Ip has a volume of 1-5 ml; and when the inner portion Ip has a volume of about 1 milliliter, the inner portion Ip accommodates up to 10 mg of active cannabinoids and/or dietary supplement formulation. An outermost portion of the outer portion may be coated with the cannabinoids and/or dietary supplement formulation, or some other edible composition in a powdered form.

The present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

Further, the method of making microemulsion and nanoemulsions may vary. The methods of using high shear and high pressure emulsification equipment and also using membrane or sonic emulsification manufacturing—regardless of how the small particle emulsion, they are generally described as microemulsion and/or nanoemulsions with a particle size of 10 nm to 999 nm.

What is claimed is:

1. A gummy comprising
   an inner portion;
   a cannabinoids and/or dietary supplement formulation having a dispersion including an active ingredient comprising one or more nutrients including at least one of cannabinoids and dietary supplement contained in the inner portion; and
   an outer portion which surrounds the inner portion;
   wherein said dispersion comprises at least one of
   (1) a liposome emulsion comprising a plurality of liposomal vesicles and phospholipid contained in said liposomal vesicles having said active ingredient incorporated therein;
   (2) a nanoemulsion comprising a plurality of droplets containing said active ingredient; and
   (3) a microemulsion comprising a plurality of droplet containing said active ingredient.

2. A gummy according to claim 1, wherein said cannabinoids comprises one of cannabidiol (CBD), tetrahydrocannabinol (THC) and a combination thereof.

3. A gummy according to claim 1, wherein a size of the liposomal vesicle ranges from 10 nm to 900 nm, a size of the droplets of nanoemulsion rages from 10 nm to 150 nm, and a size the droplets of microemulsion ranges from 90 nm to 900 nm.

4. A gummy according to claim 1, further comprising a coating material which surrounds at least one of the liposomal vesicle of the liposome emulsion, the droplets of the nanoemulsion and the droplets of the microemulsion without being attached thereto and without forming a part thereof.

5. A gummy according to claim 4, wherein said coating material comprises one of polysaccharides, starches, modified starches, gums, alginates, calcium carbonates, amorphous silicon dioxide, mono-diglycerides of fatty acids, sorbitan laurate, acacia fibers, gum Arabic, maltodextrins, polyethylene glycol, poloxamer 184-188 end chain block polymers, a biopolymer, and a combination thereof.

6. A gummy according to claim 5, wherein said biopolymer includes one of fenusterol derived from fenugreek seeds; chitosan derived from marine life including shrimp and crabs; mushroom; and a combination thereof; and wherein said coating material is free flowing in said dispersion.

7. The gummy according to claim 1, wherein said inner portion has a volume of 0.1-8 ml.

8. The gummy according to claim 7, wherein the inner portion holds about 10-800 mg of the active ingredient including said at least one of cannabinoids and dietary supplement.

9. The gummy according claim 1, wherein said formulation further comprises at least one of cyclodextrin-a, cyclodextrin-c, starches, maltodextrins gums, sodium, calcium and potassium alginates, and a combination thereof.

10. The gummy according claim 1, wherein an outermost portion of the outer portion is coated with said dispersion in a powdered form.

11. A method of making a gummy having an inner portion containing a formulation, and an outer portion surrounding the inner portion; said formulation containing a dispersion including an active ingredient comprising at least one of cannabinoids and a dietary supplement, said dispersion comprising at least one of (1) a liposome emulsion comprising a plurality of liposomal vesicles and phospholipid contained in said liposomal vesicles having said active ingredient incorporated therein; (2) a nanoemulsion comprising a plurality of droplets containing said active ingredient; and (3) a microemulsion comprising a plurality of droplet containing said active ingredient,
said method of making the gummy comprising the steps of setting up a central filling apparatus having a shell syrup hopper, a central filling hopper, a shell syrup strike piston disposed shell syrup hopper, a central filling strike piston disposed in the central filling hoper; and a manifold branch and nozzle mechanism connected with each of the shell syrup strike piston and the central filling strike piston, and a gummy mold;

filling the shell syrup hopper with a base material and maintaining said base material at a first temperature;

filling the central filling hopper with said formulation and maintaining said formulation at a second temperature;

dispensing said base material in the manifold branch and nozzle mechanism by using the shell syrup strike piston;

dispensing said formulation in the manifold branch and nozzle mechanism by using the central filling strike piston;

further dispensing said base material and said formulation in the gummy mold such that the formulation is surrounded by the base material thereby forming a gummy in the gummy mold;

decoupling the gummy mold;

cooling of the gummy mold; and extracting the gummy from the gummy mold.

12. The method of making a gummy according to claim 11, wherein cannabinoids comprises one of cannabidiol (CBD), tetrahydrocannabinol (THC) and a combination thereof.

13. The method of making a gummy according to claim 11, wherein said dispersion further comprises a coating material which surrounds at least one of the liposomal vesicle of the liposome emulsion, the droplets of the nanoemulsion and the droplets of the microemulsion without being attached thereto and without forming a part thereof; and wherein said coating material comprises one of polysaccharides, starches, modified starches, gums, alginates, calcium carbonates, amorphous silicon dioxide, mono-diglycerides of fatty acids, sorbitan laurate, acacia fibers, gum Arabic, maltodextrins, polyethylene glycol, poloxamer 184-188 end chain block polymers, a biopolymer, and a combination thereof.

14. The method of making a gummy according to claim 11, wherein said first temperature is greater than the second temperature.

15. The method of making a gummy according to claim 11, wherein said first temperature is about 80° C. and the second temperature is about 5° C. to 55° C.

16. The method of making a gummy according to claim 11, wherein said dispersion further comprises cyclodextrin-a and cyclodextrin-c.

17. The method of making a gummy according to claim 11, wherein said inner portion has a volume of 0.1-8 ml.

18. The method of making a gummy according to claim 11, wherein the inner portion holds about 10-800 mg of the active ingredient including said at least one of the cannabinoids and dietary supplement.

19. The method of making a gummy according to claim 11, wherein said phospholipid comprises one of soy, egg, fish and sunflower lecithin, and a combination thereof.

20. The method of making a gummy according to claim 11, further comprising the step of coating an outermost portion of the outer portion with said dispersion in a powdered form.

\* \* \* \* \*